May 29, 1956     H. G. BECK     2,747,420
BELT TAKE-UP MECHANISM
Filed Jan. 21, 1953
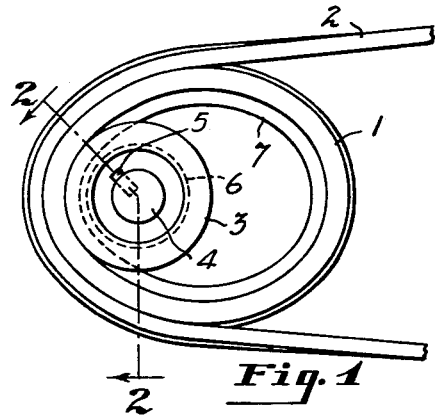
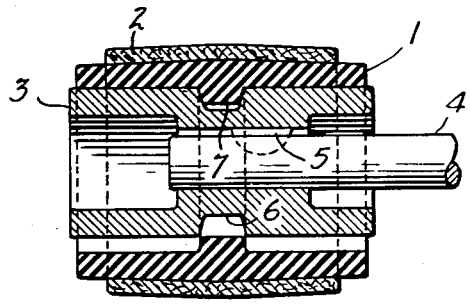
Fig. 1     Fig. 2
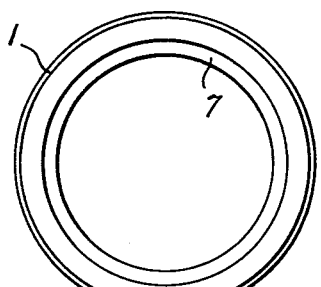
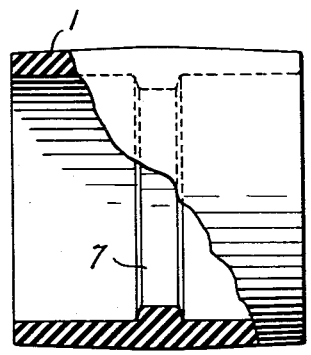
Fig. 3     Fig. 4
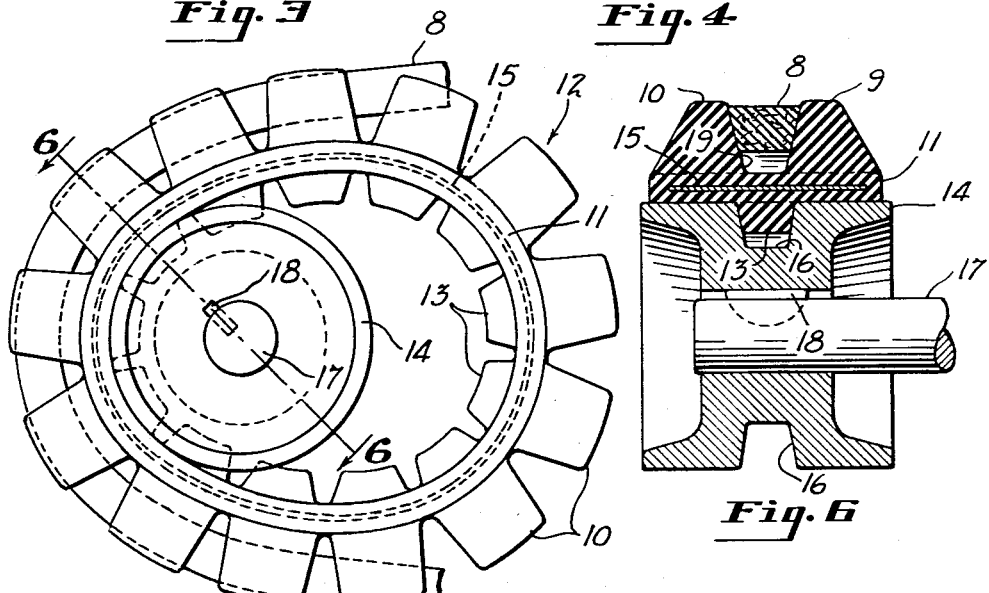
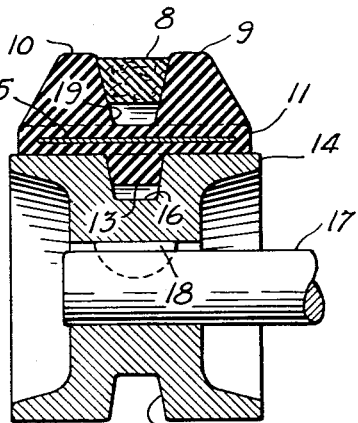
Fig. 5     Fig. 6
INVENTOR
Howard G. Beck
BY Evans + McCoy
ATTORNEYS

2,747,420

BELT TAKE-UP MECHANISM

Howard G. Beck, Akron, Ohio, assignor to The General Tire and Rubber Company, Akron, Ohio, a corporation of Ohio Application January 21, 1953, Serial No. 332,149

6 Claims. (Cl. 74—219)

This invention relates to a take-up mechanism for belt and pulley arrangements. It particularly relates to a belt take-up mechanism for use in low-power transmission, long-belt and multiple-pulley arrangements such as those in advertising signs in which a moving belt perforated or printed with letters or legends runs past a light to give the impression of words moving along the front of the sign.

In every belt and pulley arrangement in which a belt rides around a pulley or is driven by the pulley, there is a tendency for the belt to stretch and elongate. As the belt stretches, the slippage between the pulley surface and belt greatly increases so that much power is wasted, the belt stops or the speed is irregular, and the belt tends to be worn out rapidly. The belt can, of course, be shortened by splicing or by installing a new belt, but both alternatives involve considerable labor and expense.

It is accordingly one object of the subject invention to provide a belt take-up mechanism which takes up the slack in the belt as the belt lengthens and greatly minimizes the above difficulties.

It is another object of the subject invention to provide a belt take-up mechanism which automatically functions in response to the elongation of the belt.

It is still another object of the subject invention to provide a simple and inexpensive belt take-up mechanism which is easily installed and is adapted to existing power transmitting installations.

Other objects and advantages will become apparent from the following description of the invention together with the drawings, in which like numerals relate to like parts. In the drawings, Figure 1 is a side elevation of a pulley and belt provided with a take-up member of the subject invention.

Fig. 2 is a view taken along line 2—2 of Fig. 1 showing a cross-section of the pulley, belt, and take-up member.

Fig. 3 is an elevation of the take-up member.

Fig. 4 is an elevation of the take-up member with portions broken away and in cross section.

Fig. 5 is a side elevation of a modification of the subject invention as adapted to a V-belt.

Fig. 6 is a cross-sectional view taken along line 6—6 of Fig. 5.

In accordance with the subject invention, I provide an assembly comprising a cylindrical take-up member 1 of flexible and preferably resilient material which is placed over a suitable pulley such as drive pulley 3 and disposed between the pulley 3 and a belt 2. Pulley 3 is in turn keyed to shaft 4 by key 5. The cylindrical member 1 is relatively flexible and resilient and is distorted from its normal circular shape to an oval or elliptical shape as shown in Figure 1 by the compressive forces of belt 2 as the belt bends around the pulley under strain. Belt 2 is a leather, fabric, plastic or other flexible, power-transmitting belt. Pulley 3 may be an ordinary pulley or sheave over which the belt runs.

The take-up member 1 is preferably provided with contact or gripping means 7 on the inner surface thereof which fit into groove 6 in the outer surface of pulley 3. The contact means shown in Figs. 1-4 comprises a central member or rib 7 having a trapezoidal cross-sectional shape. The walls of this rib diverge outward and are narrowest at the innermost radius as shown in Fig. 4. The walls of the groove 6 in pulley 3 likewise diverge from the center of the pulley outward corresponding to the shape of the rib. Thus the rib 7 fits into the groove much as a V-belt fits into a pulley groove and provides a non-slip engagement therewith. In some cases, the frictional grip between the belt and pulley surfaces themselves will be sufficient.

The shape of the take-up member as initially constructed is shown in Fig. 3. This is circular. The shape of the take-up member in use is shown in Fig. 1 and here the shape is oval or elliptical. It can be seen that the top and bottom portions of the belt are compressing the take-up member so as to distort it from its normal circular shape. As the belt stretches, however, the compressive forces on the take-up member decrease so that the take-up member tends to gradually assume its initial circular shape. In doing so it expands and takes up slack in the belt. At the same time, the effective radius over which the belt travels, namely the pulley radius plus the thickness of the take-up member, remains constant. Thus the take-up member expands with elongation of the belt and eliminates slippage and other difficulties as noted without changing belt speed.

This invention is particularly adapted to advertising signs in which a long belt first travels back and forth over a series of pulleys and then in front of a ground glass screen. By providing applicant's take-up member on each pulley, the stretch of the belt is automatically compensated for and the sign runs for a long period without repair. Likewise, the subject take-up arrangement can be adapted to film developing and photostating machines in which pairs of belts guide film through developing and fixing tanks. The belt in such arrangements preferably does not have high tension or involve high-power transmission.

The take-up member is generally formed from resilient, relatively hard rubberlike material such as a sulfur-vulcanizable synthetic or natural rubber of 60 to 100 and preferably around 80 durameter. It can also be made of polyethylene or plasticized polyvinyl chloride or other resilient, flexible material.

The pulley contacting means can be a continuous ridge or rib 7 as shown or can be series of lugs 13 as shown in Fig. 5. If there is a high co-efficient of friction between the outer surface of the pulley and the inner surface of the belt, no particular gripping means or contacting means is required. If desired, a resilient ring of spring steel such as element 15 in Fig. 6 or phosphor bronze or similar spring material can be molded into the take-up member to provide increased resilience. It is even contemplated that in certain circumstances a resilient ring of spring material alone may be used.

A modification of the subject invention is shown in Fig. 5. Here the take-up member 11 is provided with inner lugs 13 which fit into groove 16 in the pulley 14. The take-up member has pairs of outer lugs 9 and 10 disposed around its perimeter which form between them a central groove 19 so as to provide engagement between the V belt 8 and the take-up member. Key 18 keys shaft 17 to pulley 14. Cylindrical take-up member 11 is further provided with a ring of spring steel 15 molded therein so as to provide increased resilience. This take-up arrangement functions similarly to that of Figure 1.

The subject invention is particularly adapted to installations in which the belt does not carry a heavy load or does not transmit a lot of power and in which the belt travels over many pulleys. The resiliency of the take-up member should be selected or adjusted to the load in the belt for each installation so that it can function as described. The belt also should turn through an arc of 300 to 360° so as to exert compressive forces on the take-up member.

Although several embodiments of the invention have been herein shown and described, it will be understood that in accordance with the provisions of the patent statutes, numerous modifications of the construction shown may be resorted to without departing from the spirit of the invention.

What I claim is:

1. A combination comprising a shaft, a pulley mounted thereon with a groove formed on the outer surface having side walls which converge centrally of the pulley, a cylindrical take-up member of rubberlike material provided with lugs on the inner circumference thereof which fit into the groove in said pulley and engage said pulley without slippage, the inner radius of said take-up member being materially greater than the outer radius of the pulley, and a belt disposed over said take-up member, said cylindrical member being cylindrical in its natural undistorted shape and being temporarily distorted from its natural shape by the forces of said belt and assuming an out-of-round oval shape while simultaneously taking up slack in said belt.

2. The combination of claim 1 in which the take-up member has a concentric extensible resilient ring in the body thereof.

3. A combination comprising a shaft, a pulley mounted thereon with a groove formed in the outer surface having side walls which converge centrally of the pulley, a cylindrical take-up member of resilient, rubberlike material provided with lugs on the inner circumference thereof which fit into the groove in said pulley and engage said pulley without slippage, the inner radius of said take-up member being materially greater than the outer radius of said pulley, a side-by-side plurality of lugs on the outer circumference of said take-up member which form a central groove for a belt, and a V-belt disposed over said take-up member which in turn is disposed over said pulley and fits into the groove in said pulley and engages said pulley without slippage.

4. A combination comprising a shaft, a pulley mounted on said shaft with a groove formed in the outer circumference having side walls which converge centrally of the pulley, a resilient, initially cylindrical take-up member of rubberlike material disposed over said pulley and provided with a plurality of lugs on the inner circumference thereof which fits into the groove in said pulley and engages said pulley without slippage, the inner radius of said cylindrical member being materially greater than the outer radius of the pulley, and a belt passing over said cylindrical member whereby the tension in the belt deforms said cylindrical member into a substantially oval shape.

5. The combination of claim 4 in which the cylindrical member is provided with a concentric ring or metallic spring material in the body thereof.

6. A combination comprising a shaft, a pulley mounted on said shaft with a groove formed in the outer circumference having side walls which converge centrally of the pulley, a resilient, initially cylindrical take-up member of rubberlike material disposed over said pulley and provided with a continuous rib on the inner circumference thereof which fits into the groove in said pulley and engages said pulley without slippage, the inner radius of said cylindrical member being materially greater than the outer radius of the pulley, and a belt passing over said cylindrical member whereby the tension in the belt deforms said cylindrical member into a substantially oval shape.

References Cited in the file of this patent

UNITED STATES PATENTS

| Number | Name | Date |
|---|---|---|
| 703,359 | White | June 24, 1902 |
| 1,456,458 | Nordell | May 22, 1923 |
| 1,615,544 | Hutchison | Jan. 25, 1927 |
| 2,161,270 | Anderson | June 6, 1939 |
| 2,300,706 | Schott | Nov. 3, 1942 |
| 2,355,666 | MacGregor | Aug. 15, 1944 |
| 2,534,679 | Place | Dec. 19, 1950 |
| 2,647,409 | Keim | Aug. 4, 1953 |

FOREIGN PATENTS

| Number | Country | Date |
|---|---|---|
| 540,373 | France | Apr. 15, 1922 |